(12) United States Patent
Lambin et al.

(10) Patent No.: US 9,811,904 B2
(45) Date of Patent: Nov. 7, 2017

(54) METHOD AND SYSTEM FOR DETERMINING A PHENOTYPE OF A NEOPLASM IN A HUMAN OR ANIMAL BODY

(71) Applicant: Stichting Maastricht Radiation Oncology "Maastro-Clinic", Maastricht (NL)

(72) Inventors: Philippe Lambin, Maastricht (NL); Hugo Johannes Wilhelmus Louis Aerts, Maastricht (NL)

(73) Assignee: STICHTING MAASTRICHT RADIATION ONCOLOGY "MAASTRO-CLINIC", Maastricht (NL)

(*) Notice: Subject to any disclaimer, the term of this patent is extended or adjusted under 35 U.S.C. 154(b) by 0 days.

(21) Appl. No.: 14/783,974

(22) PCT Filed: Apr. 17, 2014

(86) PCT No.: PCT/NL2014/050248
§ 371 (c)(1),
(2) Date: Oct. 12, 2015

(87) PCT Pub. No.: WO2014/171830
PCT Pub. Date: Oct. 23, 2014

(65) Prior Publication Data
US 2016/0078613 A1     Mar. 17, 2016

(30) Foreign Application Priority Data

Apr. 19, 2013  (EP) .................................... 13164418

(51) Int. Cl.
*G06K 9/00* (2006.01)
*G06T 7/00* (2017.01)

(52) U.S. Cl.
CPC .......... *G06T 7/0012* (2013.01); *G06K 9/0014* (2013.01); *G06T 2207/10081* (2013.01);
(Continued)

(58) Field of Classification Search
None
See application file for complete search history.

(56) References Cited

U.S. PATENT DOCUMENTS 5,982,917 A * 11/1999 Clarke .................. G06T 7/0012
128/922
7,734,102 B2 * 6/2010 Bergeron ............... G01N 23/04
378/57

(Continued)

FOREIGN PATENT DOCUMENTS

NL        1037077        12/2010

OTHER PUBLICATIONS

European Patent Office, International Search Report in International Patent Application No. PCT/NL2014/050248, dated Jun. 4, 2014, 2 pp.

(Continued)

*Primary Examiner* — Hadi Akhavannik
(74) *Attorney, Agent, or Firm* — Leydig, Voit & Mayer, Ltd.

(57) ABSTRACT

The present invention relates to a decision support system and an image analysis method for providing information for enabling determination of a phenotype of a neoplasm in a human or animal body for enabling prognostication, comprising the steps of: receiving, by a processing unit, image data of the neoplasm; and deriving, by the processing unit, a plurality of image feature parameter values from the image data, said image parameter values relating to image features associated with the neoplasm; and deriving, by said processing unit using a signature model, one or more neoplasm (Continued)

signature model values associated with the neoplasm from said image feature parameter values, wherein said signature model includes a functional relation between or characteristic values of said image feature parameter values for deriving said neoplasm signature model values.

18 Claims, 7 Drawing Sheets

(52) U.S. Cl.
CPC .............. *G06T 2207/30064* (2013.01); *G06T 2207/30096* (2013.01)

(56) References Cited

U.S. PATENT DOCUMENTS

| 7,991,242 | B2* | 8/2011 | Perron ..................... G06K 9/28 382/103 |
|---|---|---|---|
| 2008/0033894 | A1 | 2/2008 | Steck et al. |
| 2010/0142775 | A1 | 6/2010 | Ganeshan et al. |

OTHER PUBLICATIONS

European Patent Office, Written Opinion in International Patent Application No. PCT/NL2014/050248, dated Jun. 4, 2014, 9 pp.
Loew, "Feature Extraction," *Handbook of Medical Imaging*, vol. 2, 2004. pp. 273-341.
Wiecek et al., "Breast Cancer Screening Based on Thermal Image Classification," *Medical Infrared Imaging*, Dec. 2012; pp. 15.1-15.20.
Cook et al., "Are Pretreatment $^{18}$F-PDG PET Tumor Textural Features in Non-Small Cell Lung Cancer Associated with Response and Survival After Chemoradiotherapy?" The Journal of Nuclear Medicine, vol. 54, No. 1, pp. 19-26 (Jan. 2013).
Sanghera et al., "Reproducibility of 2D and 3D Fractal Analysis Techniques for the Assessment of Spatial Heterogeneity of Regional Blood Flow in Rectal Cancer," Radiology, vol. 263; No. 3, pp. 865-873 (Jun. 2012).
Chicklore et al., "Quantifying Tumor Heterogeneity in $^{18}$F-FDG PET/CT Imaging by Texture Analysis," Eur. J Nucl Med Mol Imaging. Vol. 40, pp. 133-140 (2013).
Lambin et al., "Predicting Outcomes in Radiation Oncology—Multifactorial Decision Support Systems," Nature Reviews, Clinical Oncology, vol. 10, pp. 27-40 (Jan. 2013).
Ganeshan et al., "Non-Small Cell Lung Cancer: Histopathologic Correlates for Texture Parameters at CT," Radiology, vol. 266: No. 1, pp. 326-336 (Jan. 2013).
Ng et al., "Assessment of Tumor Heterogeneity by CT Texture Analysis: Can the Largest Cross-Sectional Area be Used as an Alternative to Whole Tumor Analysis," European Journal of Radiology, 82, pp. 342-348 (2013).
Ng et al., "Assessment of Primary Colorectal Cancer Heterogeneity by Using Whole-Tumor Texture Analysis: Contrast-enhanced CT Texture as a Biomarker of 5-year Survival," Radiology, vol. 266: No. 1, pp. 177-184 (Jan. 2013).

* cited by examiner

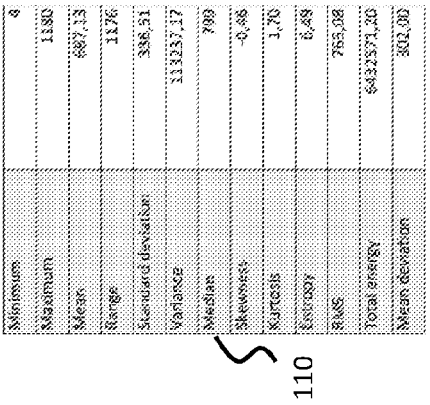
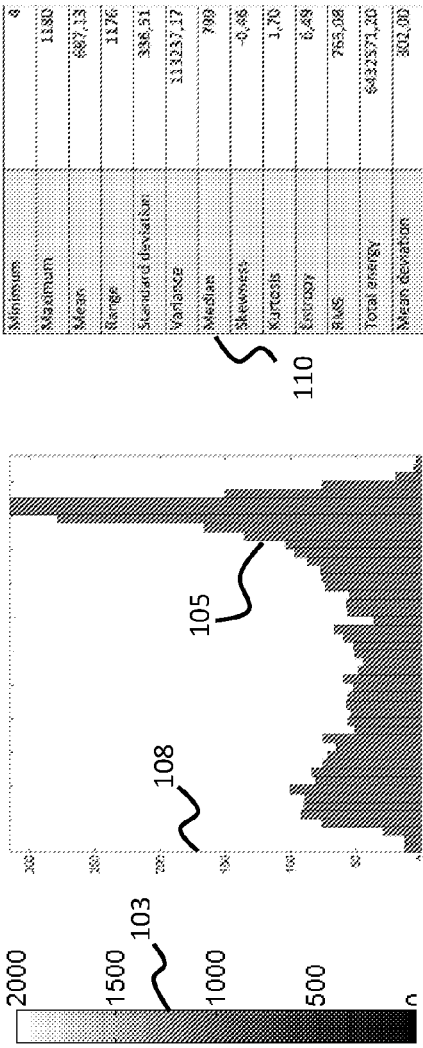
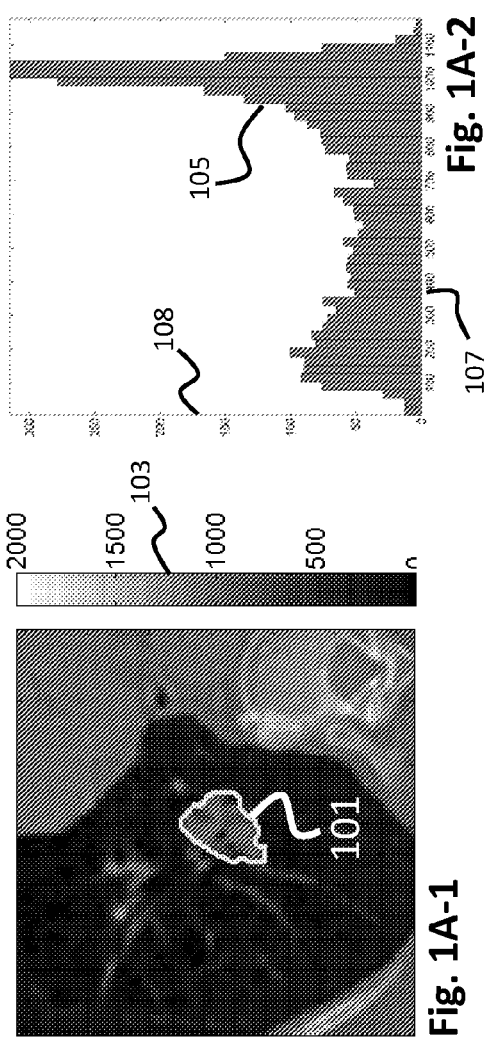
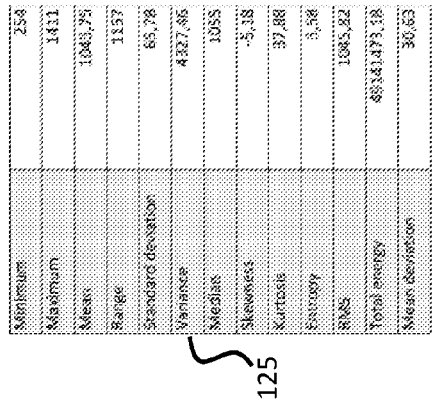
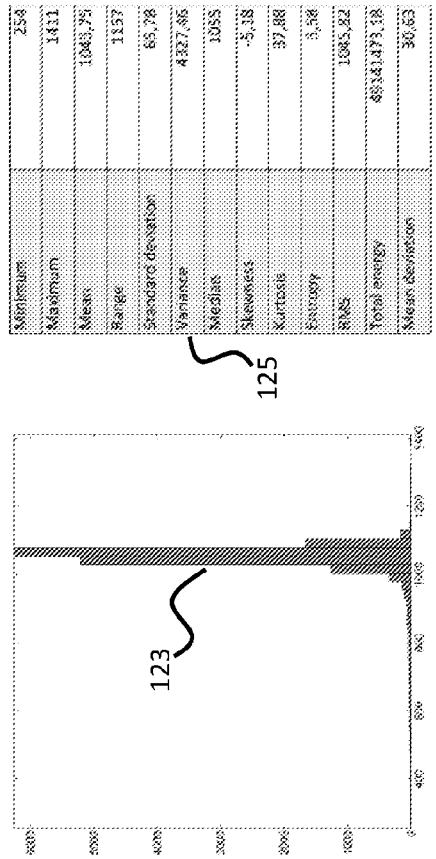

| | |
|---|---|
| Volume | 56.16 |
| Max. diameter | 9.14 |
| Surface | 136.94 |
| SVR | 2.44 |
| Sphericity | 0.52 |
| SD | 0.55 |
| Compactness (1) | 1.19 |
| Compactness (2) | 0.14 |
Fig. 2A-2
| | |
|---|---|
| Volume | 120.12 |
| Max. diameter | 13.40 |
| Surface | 98.99 |
| SVR | 0.74 |
| Sphericity | 0.85 |
| SD | 0.01 |
| Compactness (1) | 6.03 |
| Compactness (2) | 0.43 |
Fig. 2B-2
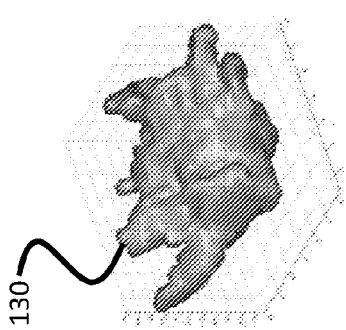
Fig. 2A-1
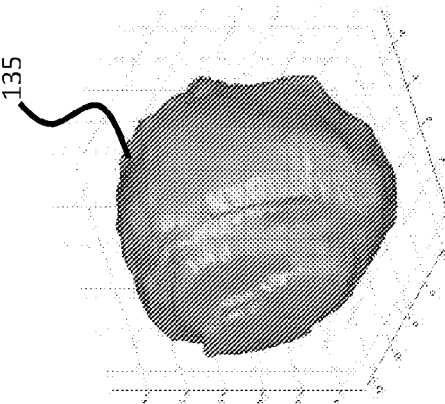
Fig. 2B-1

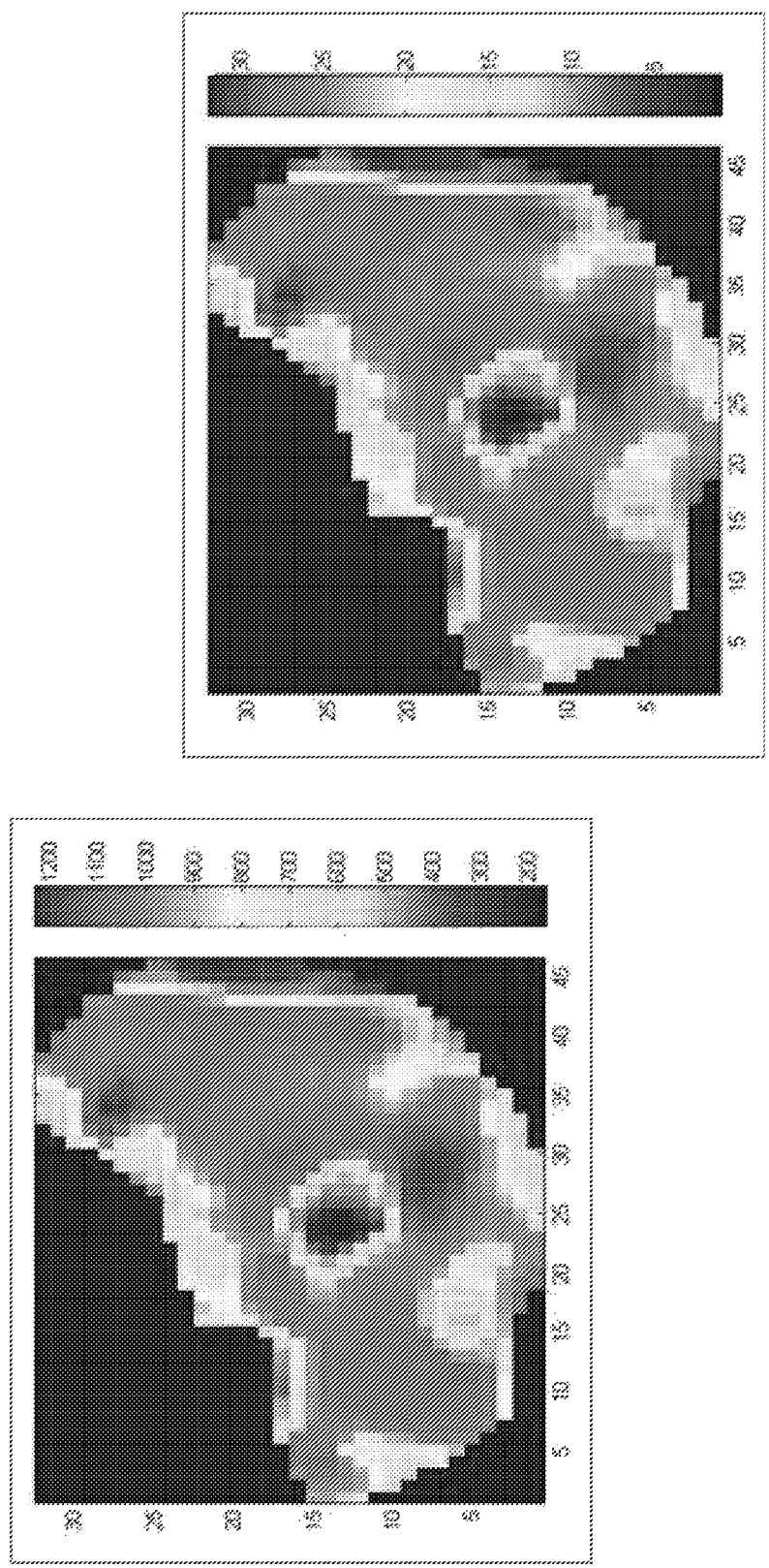

METHOD AND SYSTEM FOR DETERMINING A PHENOTYPE OF A NEOPLASM IN A HUMAN OR ANIMAL BODY

CROSS-REFERENCE TO RELATED APPLICATIONS

This patent application is a U.S. National Phase Patent Application of International Patent Application No. PCT/NL2014/050248, filed Apr. 17, 2014, claiming the benefit of European Patent Application No. 1316418.9, filed Apr. 19, 2013, the disclosures of which are incorporated by reference in their entireties.

FIELD OF THE INVENTION

The present invention relates to a method of determining a phenotype of a neoplasm in a human or animal body for enabling prognostication, comprising the steps of: receiving, by a processing unit, image data of the neoplasm; and deriving, by the processing unit, a plurality of image feature parameter values from the image data, said image parameter values relating to image features associated with the neoplasm.

The invention further relates to a decision support system, and to a computer program product and a computer readable medium comprising a computer program product.

BACKGROUND

Non-invasive imaging is one of the major factors that propelled medical science and treatment over the past decades. By assessing the characteristics of human tissue, imaging is often used in clinical practice for oncologic diagnosis and treatment guidance. A key goal of imaging is personalized medicine, were the treatment is tailored towards the specific characteristics of the patient. For personalized medicine, recent developments in the fields of genomics and proteomics have enabled the molecular characterization of tissue, such as neoplasms (i.e. tumors). However, as tumors are spatially and temporally heterogeneous, these techniques are limited, as they require biopsies or invasive surgeries to extract part of the tissue under study. Therefore, imaging can be of large importance as imaging can capture intra-tumoral heterogeneity, is already performed in routine practice, is non-invasive, and can be acquired during time.

Probably the most widespread imaging modality is computed tomography (CT), assessing the density of the tissue. Indeed, CT images of lung cancer exhibit strong differences in tumor intensity, texture, and shape. However, in clinical practice only measures describing tumor size are routinely extracted to assess response to therapy. While tumor size has demonstrated its clinical validity, it does not reflect pathological differences. There are investigations that have identified this appearance of the tumor on CT images, to provide qualitatively information about tumor characteristics like type, degree, spread, or aggressiveness. However, these characteristics are typically described subjectively (e.g. "moderate heterogeneity", "highly spiculated", "large necrotic core"). Moreover, recent advances in image acquisition, standardization, and image analysis, now allows for objective imaging biomarkers that are potentially prognostic or predictive.

Despite the above advancements, interpretation of imaging data of tumors remains to be a complex task. As a result, there is a need for sophisticated data analysis methods that enable to derive information from imaging data which aids oncologists and medical practitioners in selecting a proper curative treatment.

SUMMARY OF THE INVENTION

The following presents a simplified summary in order to provide a basic understanding of some aspects described herein. This summary is not an extensive overview. It is not intended to identify key or critical elements of the disclosure or to delineate the scope of the disclosure. The following summary merely presents some concepts directed to techniques for image analysis of imaging data of a human or animal neoplasm (i.e. a tumor), in a simplified form as a prelude to the more detailed description provided below.

The term "neoplasm" as used in this document is to be interpreted as an abnormal mass of tissue as a result of neoplasia, i.e. the abnormal growth or division of cells. The term neoplasm includes tumors, which form a particular type of neoplasms. Since the teachings of the present document are likely to be applied primarily to image analysis of tumors in research to and treatment of cancer, the neoplasms will throughout the text in many occasions be referred to as tumors. However, it is to be understood that the image analysis method of the present invention may potentially be applied to the imaging of other neoplasms, such as for example fibroids.

It is an object of the present invention to provide an image analysis method and system for deriving from image data of a human or animal neoplasm a phenotype useable as an aid to the medical practitioner for prognostication purposes and proper curative treatment selection by the medical practitioner.

These and other objects of the invention have been achieved in that there is provided an image analysis method in accordance with claim 1.

The invention relates to an image analysis method for providing information for enabling determination of a phenotype of a neoplasm in a human or animal body for enabling prognostication, comprising the steps of: receiving, by a processing unit, image data of the neoplasm; and deriving, by the processing unit, a plurality of image feature parameter values from the image data, said image parameter values relating to image features associated with the neoplasm; deriving, by said processing unit using a signature model, one or more neoplasm signature model values associated with the neoplasm from said image feature parameter values, wherein said signature model includes a functional relation between or characteristic values of said image feature parameter values for deriving said neoplasm signature model values therefrom; wherein the image feature parameter values are indicative of image feature parameters, wherein the signature model includes at least all of the image feature parameters from a group comprising: gray-level non-uniformity, and wavelet high-low-high gray-level run-length gray-level non-uniformity. In accordance with an embodiment, the signature model further includes at least all of the image feature parameters from a group comprising: statistics energy, and shape compactness.

According to an embodiment of the invention, the method further comprises the steps of: obtaining, by said processing unit from a memory, said signature model comprising one or more signature selector values associated with the image features, wherein the signature selector values indicate whether the associated image features are comprised by the signature model; multiplying for the at least one signature model, by the processing unit, the image feature parameter values with the associated signature selector values for obtaining the one or more neoplasm signature model values associated with the neoplasm.

The method of the invention enhances data analysis of imaging data by deriving one or more neoplasm signature model value therefrom that increase predictive and prognostic value of the image for the medical practitioner. As will be appreciated, the neoplasm signature model value itself may be the output of the method of the invention. Alternatively, in a preferred embodiment, the method includes a step of comparing, by the processing unit, the neoplasm signature model values to at least one signature model reference value for the at least one signature model, for associating the neoplasm with the phenotype.

In accordance with the principles of the present invention, the image analysis method uses signature models of combinations of selected image features to distinguish specific phenotypes of neoplasms from each other. It has been discovered that the specific phenotypes of neoplasms identified this way distinguish in their behavior in terms of growth, aggressiveness, and response to specific types of treatment. Therefore, by distinguishing the phenotypes of neoplasms using the method of the present invention, the medical practitioner is aided in prognostication and effective treatment selection.

The fundamental hypothesis underlying the invention is that quantitative image feature analysis better allows therapies to be tailored to individual patients and thus lead to improved survival and quality of life. Therefore the present image analysis system enables to compare imaging data available through conventional clinical imaging tools (CT, PET/CT, MR and MR/PET) to predictive signature models allowing to establish classification of a neoplasm to the aid of a medical practitioner. The invention converts imaging data, by using a high number of automatically extractable image metrics, into a high dimensional mineable feature space (i.e. "radiomics"). The used signature models of imaging features help to identify distinct pathologic differences of tumors and have prognostic power, and are therefore of clinical significance.

The particular image features that are used in and make up the various signature models that may be used in the method in accordance with the present invention, will be explained in more detail later in this document. These image features have in common that each of them is derivable by performing advanced image analysis of the image data. Moreover, these features are reproducible. For example a part of the image features used in the signature models relate to tumor intensity, and may be derived from the intensity or color of individual pixels or areas within the image, or from (statistical) analysis of the image histogram. As a further example, part of the image features relate to the shape and size of a tumor, and may be derived amongst others from contour analysis. Moreover, a further part of the image features describes textural differences of the image of the tumor, and may for example be determined using a co-occurrence matrix of the image. These latter features may for example relate to homogeneity and heterogeneity differences in the texture.

In accordance with an embodiment of the invention, the signature selector values used in the image analysis method further comprise one or more weighing values associated with the image features comprised by the signature model, for weighing the image features in the signature model. It has been found that in addition to proper selecting of the relevant image features to be included in each of the signature models, weighing of these image features by means of weighting factors improves the predictive and prognostic value of the result of the image analysis method. In accordance with this embodiment, each of the signature models used not only identifies and selects the proper image features to be used in the signature model, but also comprises for each of the image features a weighting factor indicating the quantitative importance of the specific image feature within that signature model.

In accordance with a further embodiment of the present invention, the image analysis method further comprises a step of calculating, by the processing unit, a neoplasm signature model score as a function of the one or more neoplasm signature model values, wherein the step of comparing includes comparing the neoplasm signature model score with a reference score. As will be appreciated, in some cases an overview of the relevant image feature parameter values within the signature model may provide some additional information to a user of the image analysis method. However, in other cases, identification of a phenotype may benefit from the calculation of a single neoplasm signature model score for the particular signature model which may be compared or matched to a reference score to enable classification of the neoplasm. Moreover, the calculation of such a neoplasm signature model score, which may for example be a linear combination of the selected image feature parameter values for the signature model and their weighting factors, enables to perform an automatic classification of a tumor or neoplasm that may be suggested to the user for evaluation by a medical practitioner to support interpretation of the results.

Instead of performing the image analysis method for a single signature model, in accordance with a further embodiment the at least one signature model comprises a plurality of distinct signature models. As will be appreciated, by performing the same method using a plurality of distinct signature models, eventually, a more reliable result may be achieved by the image analysis method increasing the value to the user thereof.

In the image analysis method in accordance with the embodiments of the present invention, the image feature parameters may further include at least one of a group comprising first-order gray level statistics obtained from image pixels or area's of the image from the image data, such as minimum intensity, maximum intensity, mean intensity, intensity range, intensity variance, intensity standard deviation, skewness, kurtosity, and entropy; second-order gray level statistics obtained from co-occurrence matrices of the image data, such as contrast, correlation between neighboring image areas or pixels, energy, homogeneity, inverse difference moment, sum average, sum variance, and sum entropy; run-length gray level statistics, short run emphasis, long run emphasis, run percentage; or shape and size based features, such as perimeter, cross-sectional area, major axis length, maximum diameter, and volume.

The invention, as a particular preferred embodiment, uses a signature model including the gray level non-uniformity applied to the high-low-high filtered wavelet transform of the image data as one of the image features. It has been found that signatures including this image feature, either alone or in combination with other features, are particularly useful for predicting response to treatment of a neoplasm. These signatures therefore have particular prognostic value.

From the abovementioned image feature parameter values which are indicative of image feature parameters, a specific signature model has been identified that is of particular value in prognostication, survival prediction and treatment selection. The table below provides this signature model that is of particular relevance for prognostication. In the table, the relevant image feature parameters are identified (with weighting factors) that make up the signature model. This signature model may, optionally, be used in combination with other image feature parameter values to gain additional information.

| Feature | Weight | Weight Range |
|---|---|---|
| Statistics Energy | 2.42e−11 | 1.0e−20-1.0e−05 |
| Shape Compactness | −5.38e−03 | 1.0e−07-1.0e−01 |
| RLGL_grayLevelNonuniformity | −1.47e−04 | 1.0e−09-1.0e−01 |
| Wavelet_HLH_rlgl_grayLevelNon-uniformity | 9.39e−06 | 1.0e−10-1.0e−02 |

The image analysis method in accordance with an embodiment of the present invention may receive the image data through a plurality of different imaging methods used in prognostication and treatment of tumors. For example, the imaging method may be selected from a group comprising magnetic resonance imaging (for example (but not limited to) magnetic fields of 1.5 to 9 Tesla), computed tomography (single, dual or multiple energy), positron emission tomography (fluorodeoxy glucose or other biomarkers, such as (but not limited to) F miso HX4 . . . ), single-photon emission computed tomography, ultrasonography, thermography, photo-acoustic imaging.

In a further advantageous embodiment, the step of receiving image data comprises the steps of receiving first image data of the neoplasm at a first moment in time and receiving second image data of the neoplasm in a second moment in time. In this embodiment, the steps of deriving the image feature parameter values, obtaining the signature model, and multiplying the image feature parameter values with the associated signature selector values is performed for the first and second image data, and the method further comprises a step of determining a difference between a neoplasm signature model values of the first and second image data. The first and second image data on the neoplasm and respectively the first moment in time and second moment in time may for example be obtained from a memory or storage device, or may be obtained directly from the imaging method applied for diagnostic purposes. For example, after performing the step of imaging, image data from an earlier image taken from a tumor for example days or weeks prior to the present imaging step may be used with the present embodiment for determining a difference between neoplasm signature model values of the first and second image data. From this, the medical practitioner may obtain valuable information, for example on the effect of the selected treatment. As will be appreciated, this embodiment may be extended by comparing first and second image data with a third, fourth, fifth, or further image data taken throughout the curative treatment of a tumor.

In accordance with a further aspect of the present invention there is provided a decision support system for performing an image analysis method in accordance with a first aspect described hereinabove, for determining a phenotype of a neoplasm in a human or animal body for enabling prognostication, said system comprising an input connected to a processing unit for receiving by the processing unit image data of the neoplasm; wherein the processing unit is further arranged for deriving a plurality of image feature parameter values from the received image data, said image parameter values relating to image features associated with the neoplasm, wherein the processing unit is connected to a memory for obtaining therefrom at least one signature model comprising one or more signature selector values associated with the image features, wherein the signature selector values indicate whether the associated image features are comprised by the signature model, and wherein the processing unit is arranged for multiplying for the at least one signature model the image feature parameter values with the associated signature selector values for obtaining one or more neoplasm signature model values associated with the neoplasm, and comparing the neoplasm signature model values to at least one signature model reference value for the at least one signature model, for associating the neoplasm with the phenotype, the system further comprising an output for providing an indicator value indicative of a result of said step of associating; wherein the image feature parameter values are indicative of image feature parameters, wherein the signature model includes at least all of the image feature parameters from a group comprising: statistics energy, shape compactness, gray-level non-uniformity, wavelet high-low-high gray-level run-length gray-level non-uniformity.

The invention, in accordance with further aspects thereof, relates to a computer program product, wherein the computer program product comprises computer instructions which, when run on a computer, are arranged for performing an image analysis method in accordance with the first aspect; and to a computer readable medium comprising such a computer program product.

BRIEF DESCRIPTION OF THE DRAWINGS

The present invention will further be elucidated by means of some specific embodiments thereof, with reference to the enclosed drawings, wherein:

FIG. 1A-1 is a grey level image describing tumor intensity of a first tumor;

FIG. 1A-2 is a histogram of the image of FIG. 1A-1;

FIG. 1A-3 provides an overview of image feature parameter values and corresponding image feature parameters derived from first order grey level statistics of the grey level image of FIG. 1A-1;

FIG. 1B-1 provides a grey level image describing tumor intensity of a second tumor;

FIG. 1B-2 is a histogram of the grey level image of FIG. 1B-1;

FIG. 1B-3 provides an overview of image feature parameter values and associated image feature parameters derived from first order grey level statistics obtained by analyzing the image of FIG. 1B-1;

FIG. 2A-1 illustrates a three dimensional representation of a third tumor;

FIG. 2A-2 provides an overview of image feature parameter values of image feature parameters obtained from shape and/or size analysis of the tumor based on FIG. 2A-1;

FIG. 2B-1 provides a three dimensional representation of a fourth tumor;

FIG. 2B-2 provides an overview of image feature parameter values and associated image feature parameters obtained by shape and/or size analysis based on the image illustrated in FIG. 2B-1;

FIG. 3 is an illustration of a surface contour analysis for obtaining the maximum diameter of a tumor;

FIG. 7 is a gray scale ROI image of a tumor from which a gray-level co-occurrence matrix may be determined in accordance with an embodiment of the invention.

DETAILED DESCRIPTION

Before providing a more detailed description of the various image feature parameters which may be derived from image features obtained from imaging data of neoplasms such as tumors, a description will be given herein below with reference to FIGS. 5 and 6 of a decision support system and an image analysis method in accordance with the present invention.

Figure 5:
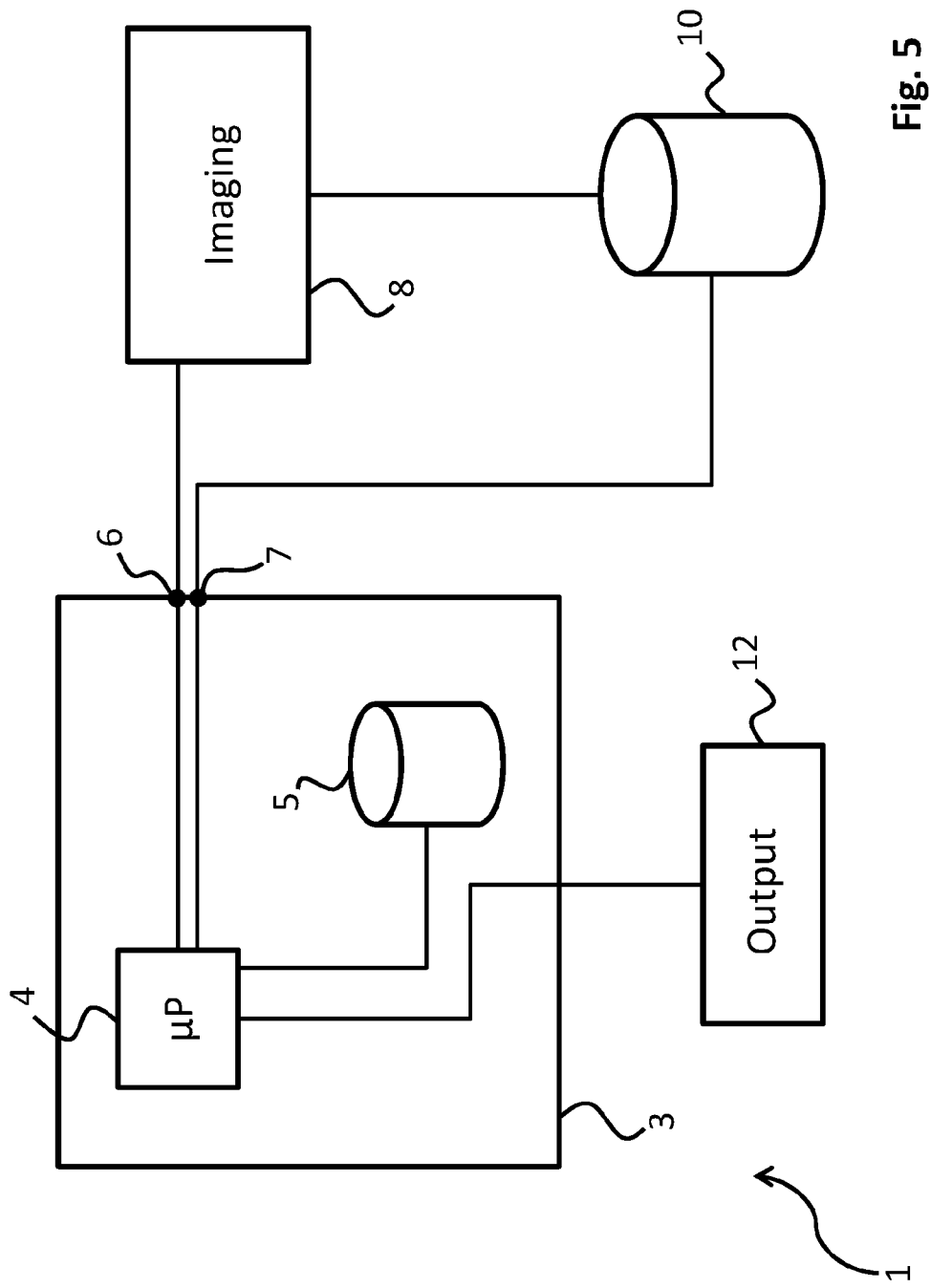
FIG. 5 is a schematic illustration of a decision support system in accordance with an embodiment of the present invention.

FIG. 5 schematically illustrates a decision support system in accordance with an embodiment of the present invention. In FIG. 5, the decision support system 1 comprises at least an analysis unit 3 which is connected to an imaging system 8. The imaging system 8 may be any suitable imaging system used in medical environments for diagnostic purposes, in particular for visualizing tumors. The imaging system 8 may for example be a magnetic resonance imaging system (MRI), a computer tomography system (CT), a positron emission tomography system (PET), a single photon emission computer tomography system (SPECT), an ultrasonography system, a tomography system, or a photo acoustic imaging system. The imaging system 8 may provide image data directly to the analysis system 3, or may alternatively store the image data in a data repository data system 10 from which it may be obtained by the analysis system 3 at any time required. As will be appreciated, the analysis system 3, the imaging system 8, the data repository system 10, and any output terminal or system 12, may be connected with each other via a data network, or via direct data connections.

As mentioned hereinabove, the analysis system 3 receives imaging data either directly from the imaging system 8 or retrieves it from a data repository system 10 where the image data may be stored. Another possibility is that part of the image data is received directly from the imaging system 8 by analysis unit 3, and another part of imaging data, e.g. imaging data taken from a same tumor at an earlier stage during a treatment of a patient, may be obtained from data repository system 10. As will be appreciated, imaging data may alternatively be obtained from another source or via other means. For example, such data may be obtained from a remote network, from an e-mail server, or from a data storage entity such as a memory stick or an SD card. Performing an analysis in accordance with the present invention on imaging data taken at various stages throughout a treatment process provides information to a medical practitioner that may be used for evaluating the treatment process, and to take necessary action.

The analysis unit 3 comprises a processing unit which receives the image data from input/output ports 6 and 7. The processing unit is arranged for deriving a plurality of image feature parameter values associated with image feature parameters from the image data received. Through this end, the processing unit 4 applies various analysis algorithms, such as statistical analysis algorithms, graphic analysis algorithms and the like. Such algorithms may for example be stored in memory unit 5 within analysis unit 3. The processing unit may further be arranged to obtain one or more signature models from memory unit 5. Each of the obtained signature models comprises signature selector values which determine whether or not specific image feature parameters are included in the respective signature model. Instead of only comprising signature selector values, the signature models may also comprise weighting factors also stored in memory unit 5. Such weighting factors not only determine that a certain image feature parameter is included in the signature model, but also enable to prescribe the importance of a certain image feature parameter in the signature model, e.g. in terms of its predictive value in relation to or in combination with other parameters.

The processing unit 4 is arranged for multiplying each of the image feature parameter values obtained from the imaging data during the step of deriving described herein above, with their associated signature selector values or weighting factors (where applicable) for each of the signature models. This step of multiplication yields the neoplasm signature model values representing the tumor in terms of the respective signature models. These neoplasm signature model values will be used to associate the tumor with a certain phenotype in order to enable prognostication, predict survival expectance, suggest a possible treatment, and other important decision support information to be provided to the user or medical practitioner. For performing the classification of the tumor into a certain phenotype, the neoplasm signature model values are compared to signature model reference values that may for example be stored in the memory unit 5. Such comparison may take any suitable form, and may also include, as will be described for example in relation to FIG. 6, the calculation of a neoplasm signature model score as a function of the neoplasm signature model values calculated herewith. Such a neoplasm signature model score may be compared to a reference score which is also stored in the memory unit 5. The output of the analysis method is provided to an output terminal for example terminal 12. This may be any suitable computer system, display screen, a further analysis unit, a printing system, or a communication system allowing to distribute the relevant information to the user or users of the decision support system.

Figure 6:
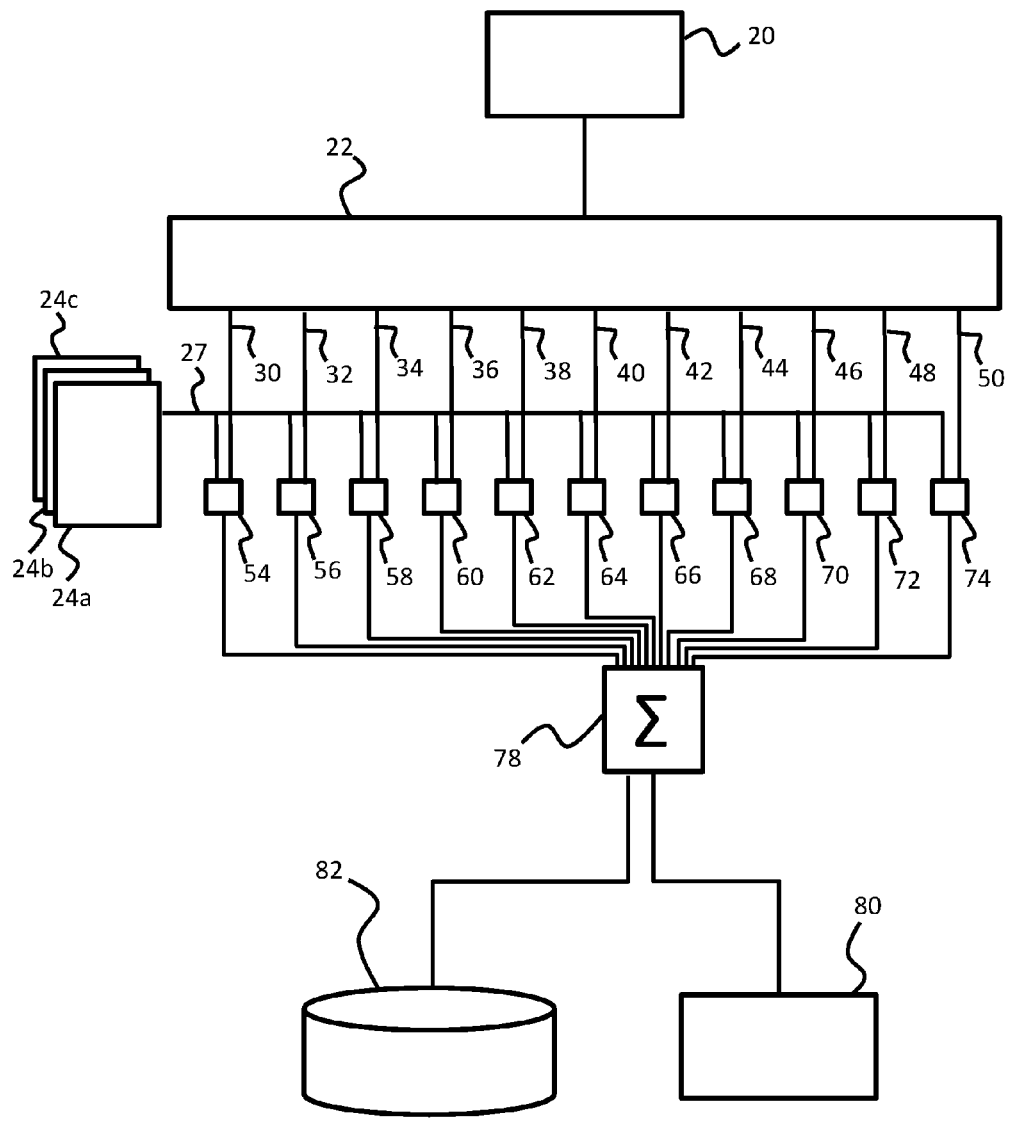
FIG. 6 is a schematic illustration of an embodiment of an image analysis method in accordance with an embodiment of the present invention.

In FIG. 6, an analysis method in accordance with the present invention is schematically illustrated. To explain the method in relation to a decision support system of the invention, reference is also made to the reference numerals and features of FIG. 5. As will be appreciated, the method and the system are only provided as an example and should not be interpreted limiting. In step 20, image data is received from an imaging system 8 by a processing unit 4. The processing unit 4 in step 22 derives from the image data received, a plurality of image feature parameter values 30, 32, 34, 36, 38, 40, 42, 44, 46, 48 and 50. As will be appreciated the image feature parameter values that should at least be determined in step 22 are dependent on the signature models to be applied. Further on in this document, a detailed description of all the image feature parameters that may be used and may be derived in step 22 will be provided. In FIG. 6, a total of eleven image feature parameter values is illustrated, but the skilled person will appreciate that any other number of image feature parameter values may be derived in this step 22.

The image feature parameter values 30-50 are multiplied by signature selector values 54-74. A signature selector value may for example include a boolean selector (which may have the value 0 or 1 dependent on whether the associated image feature parameter value is to be included in the signature model) and a weighting factor (e.g. a real value between 0 and 1). For example, factor 54 may be a multiplication of signature selector value equal to '1' and the weighting factor equal to 0.83, although these values are just examples. Each of the factors 54, 56, 58, 60, 62, 64, 66, 68, 70, 72 and 74 is set by the processing unit based on a signature model 24 (for example any of the signature models 24a, 24b, or 24c) stored in a memory. In FIG. 6, signature model 24a is applied to the factors 54-74 as indicated by schematic line 27.

The image feature parameter values are multiplied by their associated signature selector values. Image feature parameter value 30 is multiplied by signature selector values 54, image feature parameter value 32 is multiplied by signature selector values 56, image feature parameter value 34 is multiplied by signature selector values 58, image feature parameter value 36 is multiplied by signature selector values 60, image feature parameter value 38 is multiplied by signature selector values 62, image feature parameter value 40 is multiplied by signature selector values 64, image feature parameter value 42 is multiplied by signature selector values 66, image feature parameter value 44 is multiplied by signature selector values 68, image feature parameter value 46 is multiplied by signature selector values 70, image feature parameter value 48 is multiplied by signature selector values 72 and image feature parameter value 50 is multiplied by signature selector values 74. The products of the image feature parameter values and signature selector values are then provided as input to a summing step 78 for calculating a neoplasm signature model score, e.g. by summing all the values obtained such as to calculate a linear combination of the image feature parameter values 30-50 with their associated signature selector values (including weighting factors) 54-74. This score obtained in step 78 may be compared with a reference value from memory 82, and provided to the user of the analysis method in step 80. In case a comparison is made between image data from tumors at various stages during a treatment process, further image data may be obtained from a memory or repository system in step 20 and the analysis method is repeated. Eventually, the results of performing the image analysis method for each of the image data obtained will be compared and presented to the user (not shown).

As will be appreciated, the decision support system of FIG. 5 and the image analysis method of FIG. 6 are embodiments of the present invention, however the invention may be practice otherwise then specifically described with reference to FIGS. 5 and 6.

The present invention uses image feature parameter values obtained from image features derived from image data of a tumor. FIGS. 1A-1 through 1B-3 provide as a first example a number of image feature parameters and their values that may be obtained from first order grey level statistical analysis of an image. In FIG. 1A-1, a grey level image of a tumor is illustrated. The grey level scale is indicated with reference numeral 103 to the right of FIG. 1A-1. Also visible in FIG. 1A-1 is the contour 101 of the tumor to be analyzed. It is to be noted that the contour defining the tumor will usually be determined by a medical practitioner, or any other analysis method or system. The present description assumes this information to be available to the method.

In FIG. 1A-2 a histogram 105 is illustrated which is based on the image data illustrated in FIG. 1A-1. The histogram 105 resembles the tumor image only, i.e. the histogram is based on the pixels of the grey level image FIG. 1A-1 inside the contour 101. All parts of the image outside contour 101 are disregarded from the analysis and is considered to be healthy tissue. The histogram 105 is plotted onto a first access 107 indicating the grey level considered, and a second access 108 resembling the number of pixels occurring with grey level.

FIG. 1B-1 illustrates a second tumor within contour 121, and FIG. 1B-2 illustrates a corresponding histogram 123 associated with this second tumor illustrated in FIG. 1B-1. From a qualitative comparison of the images of FIG. 1A-1 and FIG. 1B-1, one can see a number of characteristic differences between the two tumors. For example, the first tumor within contour 101 appears to be inhomogeneous, while the grey level of the second tumor 121 is more uniform. This difference is for example directly visible in the histograms 105 and 123. Histogram 123 is clearly concentrated around a uniform grey level as a small but sharp peak. Histogram 105 illustrates a broad distribution having a peak at approximately grey level 1050 and a more distributed trail across almost all grey levels below this value. From the histogram of the image of the tumor, relevant information can be quantitatively derived that may also be derived from qualitative examination of the images.

In FIGS. 1A-3 and FIG. 1B-3, an overview is provided from a number of image feature parameter values and associated image feature parameters that may be derived from first order grey level statistical analysis of the images of FIGS. 1A-1 and 1B-1 respectively. These image feature parameters, which will be described with more detail later on in this document, may be used in the various signature models to obtain information that may help the medical practitioner in selecting the correct treatment, determining survival expectancy, and prognostication in general.

FIGS. 2A-1 through 2B-2 provide an example of image feature parameter and image feature parameter values that may be obtained from analysis of shape and size related features, derivable for example from three dimensional (3D) representations of tumors based on imaging data obtained. In FIG. 2A-1 a three dimensional (3D) representation of a third tumor 130 is illustrated. In FIG. 2B-1 a three dimensional (3D) representation of a fourth tumor 135 is illustrated. From qualitative comparison of the two tumors in FIGS. 2A-1 and FIGS. 2B-1, a number of differences may be derived such as a difference in size of the tumor. The fourth tumor 135 is much larger than the third tumor 130, although the third tumor 130 appears to have a much larger surface.

An overview of the image feature parameter values that may be derived from the imaging data in FIGS. 2A-1 and FIG. 2B-1 is provided in FIGS. 2A-2 and 2B-2 respectively. These image feature parameter values for example include the volumes of the tumors, their total surface and their maximum diameter. Besides this, more quantitative information on image feature parameters which may be characteristic for a specific type of tumor growth (phenotype) is derivable from the images. For example, the sphericity provides information on how spherical (i.e. regular) the tumor is. The surface to volume ratio (SVR) expresses how spiky or sharp the tumor is. A maximum diameter represents the maximum distance between the most remote points on the surface of the tumor in the three dimensional representation.

Figure 3:
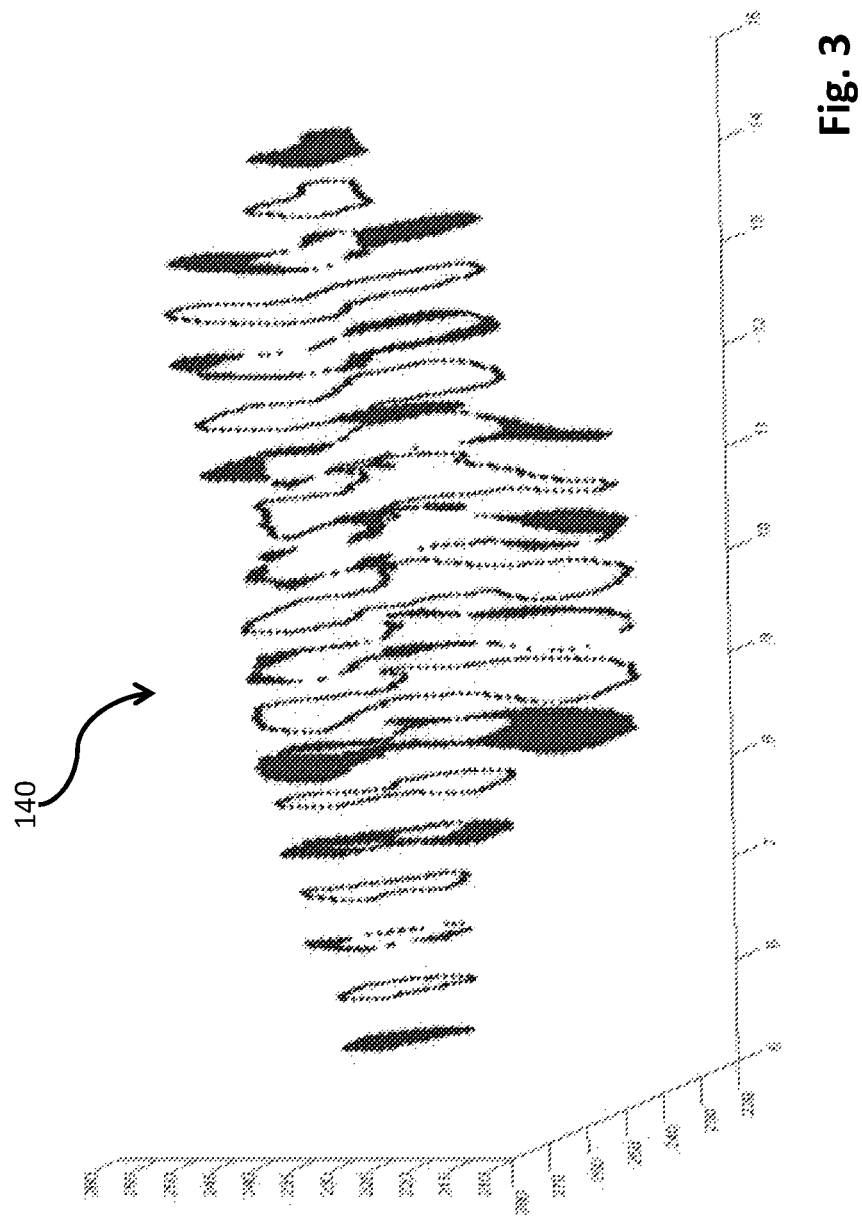

FIG. 3 provides an illustration of a contour analysis from which the maximum diameter of a tumor may be derived. The most remote points in FIG. 3 are at the ultimate ends of the tumor 140, to the left and right side of the plot in FIG. 3. In respect of FIG. 3 it is noted that the points depicted in the plot are voxels lying on the surface of the tumor.

Figure 4A:
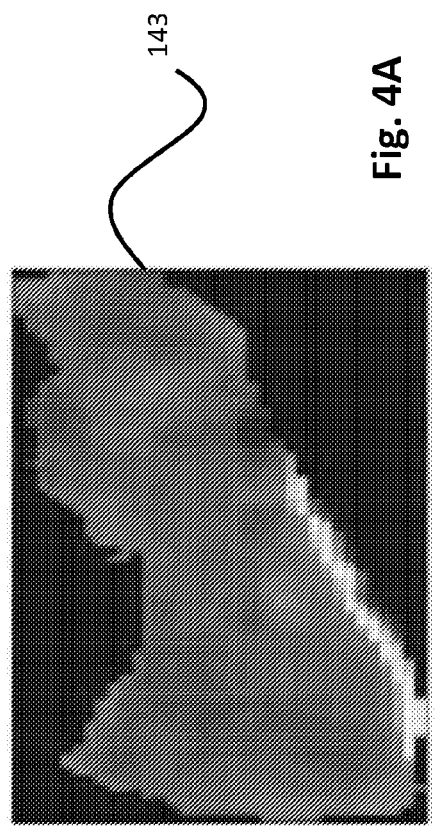
FIG. 4A provides an image of a fifth tumor.
Figure 4B:
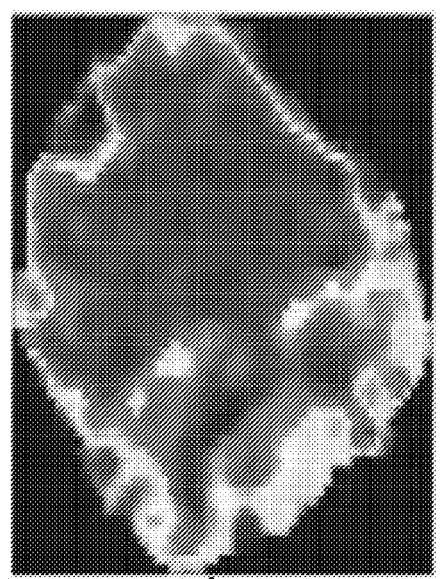
FIG. 4B provides an image of a sixth tumor.

As a further example in FIGS. 4a and 4b, a fifth tumor 143 and a sixth tumor 146 are respectively illustrated. From qualitative observation of the images in FIG. 4a and FIG. 4b, a striking difference is visible in terms of the texture of the tumors illustrated. For example, the sixth tumor 146 in FIG. 4b illustrates a strong variation in color inside the tumor and across its surface. The tumor 143 in FIG. 4a is more homogeneous, being more or less of one color. These differences in texture can be derived from co-occurrence matrices obtained from pixel color analysis of the images of these figures. The concept of co-occurrence matrices will be explained later.

Image Feature Parameter Descriptions

First-order Gray Level Statistics

In this section various image feature parameters are described that can be used to extract and summarize meaningful and reliable information from CT images. We will describe the extraction of image traits that may be used to derive prognostic metrics, and that may be incorporated into signature models of a decision support system, to beneficially support the clinical planning process to modify the patient treatment based on their predicted risk of failure. As appreciated, the objective of the invention is to support (not take over) the decision making process of the medical practitioner with advanced information taken from the images; i.e. image feature data that cannot be objectively assessed by means of qualitative interpretation.

We explore first-order statistics of the image histogram through the commonly used metrics. We denote by I(x,y) as the intensity or gray-level values of the two-dimensional pixel matrix. The formulas used for the first order statistics are as follows:

1. Minimum $$I_{min} = \min\{I(x,y)\} \tag{B.1}$$

2. Maximum $$I_{max} = \max\{I(x,y)\} \tag{B.2}$$

3. Range $$R = \max\{I(x,y)\} - \min\{I(x,y)\} \tag{B.3}$$

4. Mean $$\mu = \frac{1}{XY} \sum_{x=1}^{X} \sum_{y=1}^{Y} I(x,y) \tag{B.4}$$

5. Variance $$\sigma^2 = \frac{1}{(XY-1)} \sum_{x=1}^{X} \sum_{y=1}^{Y} [I(x,y) - \mu]^2 \tag{B.5}$$

6. Standard Deviation $$S = \left( \frac{1}{XY-1} \sum_{i=1}^{XY} (x_i - \mu)^2 \right)^{1/2} \tag{B.6}$$

7. Skewness $$\frac{1}{XY} \sum_{x=1}^{X} \sum_{y=1}^{Y} \left[ \frac{I(x,y) - \mu}{\sigma} \right]^3 \tag{B.7}$$

8. Kurtosis $$\frac{1}{XY} \sum_{x=1}^{X} \sum_{y=1}^{Y} \left\{ \left[ \frac{I(x,y) - \mu}{\sigma} \right]^4 \right\} - 3 \tag{B.8}$$

9. Entropy $$H = -\sum_{i=1}^{XY} P(i) \cdot \log_2 P(i) \tag{B.9}$$

In B.9 P(i) is the first order histogram, that is, P(i) is the fraction of pixels with gray level i. The variance ($\mu_2$), skewness ($\mu_3$) and kurtosis ($\mu_4$) are the most frequently used central moments. The variance is a measure of the histogram width, that is, a measure of how much the gray levels differ from the mean. The skewness measures the degree of histogram asymmetry around the mean, and kurtosis is a measure of the histogram sharpness. As a measure of histogram uniformity or randomness we computed the entropy of the image histogram. The closer to a uniform distribution the higher the entropy, or seen in a different way, H would take low values in smooth images where the pixels have the same intensity level.

Second-order Gray Levels Statistics

The features shown above that resulted from the first-order statistics provide information related to the gray-level distribution of the image; however they do not provide any information regarding the relative position of the various gray levels over the image. This information can be extracted from the so called co-occurrence matrices where pixels are considered in pairs and which provide a spatial distribution of the gray level values. The co-occurrence features are based on the second-order joint conditional probability function P(i,j;a,d) of a given image. The ith, jth element of the co-occurrence matrix for a given tumor image represents the number of times that the intensity levels i and j occur in two pixels separated by a distance (d) in the direction (a). The co-occurrence matrix for a pair (d,a) is defined as the $N_g \times N_g$ matrix where $N_g$ is the number of intensity levels. The $N_g$ levels were obtained by scaling the gray-level image to a discrete $N_g$ number of gray-level values. The $N_g$ values are normally selected in powers of 2; here we have selected 32 discrete gray-level values which in practice is a sufficient choice for representing the image. Here d was set to a single pixel size and a covered the four available angular directions (horizontal, vertical, diagonal and anti-diagonal). Let for example an image array I(x,y) be:

$$I = \begin{bmatrix} 3 & 5 & 8 & 10 & 8 \\ 7 & 10 & 3 & 5 & 3 \\ 7 & 3 & 5 & 1 & 8 \\ 2 & 6 & 7 & 1 & 2 \\ 1 & 2 & 9 & 3 & 9 \end{bmatrix} \tag{B.11}$$

which corresponds to a 5×5 image. We can assume the number of discrete gray levels is equal to 10. Thus for the image (B.11) and a relative pixel position (1.0°) we obtain:

$$GLCM^0(d=1) = \begin{bmatrix} 0 & 2 & 0 & 0 & 0 & 0 & 1 & 0 & 0 \\ 0 & 0 & 0 & 0 & 0 & 1 & 0 & 0 & 1 & 0 \\ 0 & 0 & 0 & 0 & 3 & 0 & 0 & 0 & 1 & 0 \\ 0 & 0 & 0 & 0 & 0 & 0 & 0 & 0 & 0 & 0 \\ 1 & 0 & 1 & 0 & 0 & 0 & 0 & 1 & 0 & 0 \\ 0 & 0 & 0 & 0 & 0 & 0 & 1 & 0 & 0 & 0 \\ 1 & 0 & 1 & 0 & 0 & 0 & 0 & 0 & 0 & 1 \\ 0 & 0 & 0 & 0 & 0 & 0 & 0 & 0 & 0 & 1 \\ 0 & 0 & 1 & 0 & 0 & 0 & 0 & 0 & 0 & 0 \\ 0 & 0 & 1 & 0 & 0 & 0 & 0 & 1 & 0 & 0 \end{bmatrix} \quad (B.12)$$

In other words, for each of the intensity pairs, such as (1, 2), we count the number of pixel pairs at relative distance (d=1) and orientation a=0° (horizontal) that take these values. In our case this is 2. There are two instances in the image (B.11) where two, horizontally adjacent pixels have the values 1 and 2. The element (3, 5) in the GLCM is 3 because in the example image there are 3 instances in which two, horizontally adjacent pixels have the values 3 and 5. From the same image (B.11) and (d=1, a=45°) we obtain:

$$GLCM^{45}(d=1) = \begin{bmatrix} 0 & 0 & 1 & 0 & 0 & 1 & 0 & 1 & 0 & 0 \\ 0 & 0 & 1 & 0 & 0 & 0 & 1 & 0 & 0 & 0 \\ 0 & 1 & 1 & 0 & 0 & 0 & 0 & 0 & 0 & 1 \\ 0 & 0 & 0 & 0 & 0 & 0 & 0 & 0 & 0 & 0 \\ 0 & 0 & 0 & 1 & 0 & 0 & 1 & 0 & 0 & 0 \\ 0 & 0 & 0 & 1 & 0 & 0 & 0 & 0 & 0 & 0 \\ 1 & 0 & 0 & 0 & 1 & 0 & 0 & 0 & 0 & 1 \\ 0 & 0 & 0 & 0 & 0 & 0 & 0 & 0 & 0 & 0 \\ 1 & 0 & 0 & 0 & 0 & 0 & 0 & 0 & 0 & 0 \\ 0 & 0 & 0 & 0 & 0 & 0 & 1 & 0 & 0 & 0 \end{bmatrix} \quad (B.13)$$

As illustrative example we will obtain the gray-level co-occurrence matrix from a given tumor image. FIG. 7 provides an example of a given gray scale ROI image (color map changed for better visual inspection) to the left, and a scaled version of the left image to 32 discrete gray levels to the right. In FIG. 7, the image in the left hand side corresponds to a given gray-level ROI image, the color map has been changed to enhance the differences for visual inspection. The image in the right corresponds to the scaled ROI with 32 discrete gray values. The co-occurrence matrices are obtained from the scaled image.

Having defined the probabilities of occurrence of gray levels with respect to relative spatial position we can define the relevant co-occurrence features that have been extracted; in some cases they have a direct physical interpretation with respect to the texture of an image, for example, they quantify coarseness, smoothness, randomness, etc. Others do not have such a property but they still encode highly discriminative texture-related information. Denoting by P(i,j) the normalized co-occurrence matrix, by $N_g$ the number of discrete gray levels of the image, the co-occurrence features relevant for our application are defined as follows:

10. Contrast $$Con = \sum_{n=1}^{N_g} n^2 \left\{ \sum_{\substack{i=1 \\ |i-j|=n}}^{N_g} \sum_{j=1}^{N_g} P(i,j) \right\} \quad (B.14)$$

This is a measure intensity contrast between a pixel and its neighbor over the entire image, that is, a measure of the local gray level variations. For a constant image this metric is zero. The $n^2$ dependence weights the big differences more.

11. Correlation $$Correlation = \sum_{i=1}^{N_g} \sum_{j=1}^{N_g} \frac{(i-\mu_i)(j-\mu_j)P(i,j)}{\sigma_i \sigma_j} \quad (B.15)$$

This metric measure how correlated is a pixel to its neighbor over the entire image. Correlation takes the values 1 or −1 for perfectly positively or negatively correlated image.

12. Energy $$Energy = \sum_{i=1}^{N_g} \sum_{j=1}^{N_g} (P(i,j))^2 \quad (B.16)$$

Energy is the sum of the squared elements of an image and a measure of smoothness. If all pixels are of the same gray level then energy is equal to 1; at the other extreme if we have all possible pairs of gray levels with equal probability, the region is less smooth, with a more uniformly distributed P(i,j) and a lower energy.

13. Homogeneity $$Homogeneity = \sum_{i=1}^{N_g} \sum_{j=1}^{N_g} \frac{P(i,j)}{1+|i-j|} \quad (B.17)$$

This feature measures how close is the distribution of elements in the co-occurrence matrix to the diagonal of the co-occurrence matrix. Homogeneity is 1 for a constant image.

14. Inverse Difference Moment $$IDM = \sum_{i=1}^{N_g} \sum_{j=1}^{N_g} \frac{P(i,j)}{1+|i-j|^2} \quad (B.18)$$

This feature takes high values for images with low contrast due to the $(i-j)^2$ dependence.

15. Sum Average $$SA = \sum_{i=2}^{2N_g} [i P_{x+y}(i)] \quad (B.19)$$

In A.18 $P_x(i)$ and $P_y(i)$ are the row and column marginal probabilities, obtained by summing the rows or columns P(i,j).

16. Sum Variance $$SV = \sum_{i=2}^{2N_g} [(i - \text{sum average})^2 P_{x+y}(i)] \quad (B.20)$$

17. Sum Entropy $$SE = -\sum_{i=2}^{2N_g} [P_{x+y}(i) \log[P_{x+y}(i)]] \quad (B.21)$$

All the second-order statistics based features are functions of the distance d and the orientation a. Here for the direction d=1, the resulting values for the four directions are averaged. These metrics take into account the local intensity and spatial relationship of pixels over the region and are independent to tumor position, size, orientation and brightness.

Run-length Gray-level Statistics

Additionally we examined gray-level runs derived from run-length matrices (RLM) using a run-length metrics. A gray level run is a set of consecutive pixels having the same gray level value. The length of the run is the number of pixels in the run. Run length features describe textural information related with the number of times each gray level appears by itself, in pairs and so on, in a certain distance and orientation. Taking for example the image $$I = \begin{bmatrix} 5 & 2 & 5 & 4 & 4 \\ 3 & 3 & 3 & 1 & 3 \\ 2 & 1 & 1 & 1 & 3 \\ 4 & 2 & 2 & 2 & 3 \\ 3 & 5 & 3 & 3 & 2 \end{bmatrix} \quad (B.22)$$

with five possible gray levels. For each of the previously defined angular directions (0°, 45°, 90° and 135°) the corresponding run length matrices are defined. The run length matrix is an $N_g \times N_r$ array where $N_r$ is the largest possible run length in the image. For distance (d=1) and orientation (a=0°) we obtain:

$$Q_{RL}(0°) = \begin{bmatrix} 1 & 0 & 1 & 0 & 0 \\ 3 & 0 & 1 & 0 & 0 \\ 4 & 1 & 1 & 0 & 0 \\ 1 & 1 & 0 & 0 & 0 \\ 3 & 0 & 0 & 0 & 0 \end{bmatrix} \quad (B.23)$$

The element (1,1) of the run length matrix is the number of times that the gray level 1 appears by itself, the second element is the number of times it appears in pairs (zero in the example), and so on. The element (3,3) is the number of times the gray level 3 appears in the image with run length 3. For the diagonal direction we obtain:

$$Q_{RL}(45°) = \begin{bmatrix} 2 & 1 & 0 & 0 & 0 \\ 6 & 0 & 0 & 0 & 0 \\ 7 & 1 & 0 & 0 & 0 \\ 3 & 0 & 0 & 0 & 0 \\ 3 & 0 & 0 & 0 & 0 \end{bmatrix} \quad (B.24)$$

Denoting by P the total number of pixels of an image, by $Q_{RL}(i,j)$ the (i,j)-th element of the run length matrix for a specific distance d and a specific angle a and by Nr the number of different runs that occur, based on the definition of the run length matrices, the following rung length features are defined:

18. Short Run Emphasis $$SRE = \frac{\sum_{i=1}^{N_g} \sum_{j=1}^{N_r} (Q_{RL}(i, j)/j^2)}{\sum_{i=1}^{N_g} \sum_{j=1}^{N_r} Q_{RL}(i, j)} \quad (B.25)$$

This feature emphasizes small run lengths. The denominator is the number of run lengths in the matrix, for example, 17 in B.23 and 23 in B.24.

19. Long Run Emphasis $$LRE = \frac{\sum_{i=1}^{N_g} \sum_{j=1}^{N_r} (Q_{RL}(i, j) \cdot j^2)}{\sum_{i=1}^{N_g} \sum_{j=1}^{N_r} Q_{RL}(i, j)} \quad (B.26)$$

In this case long run lengths are emphasized. For smoother images RLE should take larger values while SRE takes larger values with coarser image.

20. Gray Level Non-uniformity $$SRE = \frac{\sum_{i=1}^{N_g} \left[ \sum_{j=1}^{N_r} Q_{RL}(i, j) \right]^2}{\sum_{i=1}^{N_g} \sum_{j=1}^{N_r} Q_{RL}(i, j)} \quad (B.27)$$

This feature takes small values when the runs are uniformly distributed among the gray levels.

21. Run Percentage $$RP = \frac{\sum_{i=1}^{N_g} \sum_{j=1}^{N_r} Q_{RL}(i, j)}{P} \quad (B.28)$$

Run percentage takes high values for coarse images. For each angular direction, the complete set of second-order statistics and run-length features was computed but only the average value was used as feature.

Shape and Size Based Features

We extended the number of extracted image traits by adding measurements of the size and shape of the tumor region. For every two-dimensional image of the tumor in a given CT stack three features are obtained, maximum cross-sectional area, perimeter and major axis length as follows:

22. Area

We count the number of pixels in the ROI's and the maximum count is denoted as the maximum cross-sectional area.

23. Perimeter

Is the distance between each adjoining pair of pixels around the border of the region; the total sum of the perimeters for each ROI image is taken as feature.

24. Major Axis Length

This feature specifies the maximum length in pixels of the major axis of a two-dimensional ROI image.

25. Volume

The total volume of the tumor is determined by counting the number of pixels in the tumor region and multiplying this value by the voxel size. The voxel size is obtained from the PixelSpacing section of the CT Dicom Header which specifies the size of a voxel in the x, y, and z directions. The result is a value in $mm^3$. Based on the CT-GTV volume that was described above, 3D representations of the tumor volume have been rendered.

26. Maximum Diameter

In contrast with the major axis-length which was determined in two-dimensional ROI images, this feature examines the maximum diameter of the tumor region in a three-dimensional space. Firstly, we obtain the coordinates of all the points located at the surface of the tumor region; secondly, the distance between each pair of points in the tumor contour is determined using the following metric called "City Bloc Distance":

$$D = |x_1 - x_2| + |y_1 - y_2| + |z_1 - z_2| \quad (B.29)$$

The points in the tumor contour whose edges touch are 1 unit apart; points diagonally touching are separated by two units. The two points with the maximum distance are the points at the edges of the maximum diameter. In FIG. 3, as referred to above, a plot of the points in the surface of a given tumor volume is shown; the maximum diameter is calculated among the points in this image.

So far we have described the extraction of image traits regarding the gray level and spatial relationship between pixels in a region, as well as size measurements of the tumor region in two and three-dimensions. Another important issue in the task of patter recognition is the analysis of shape; in this regard the extracted image traits are completed by adding the following three shape-based features:

27. Surface to Volume Ratio.

This feature is intended to express how spiky or sharp is the tumor volume. A more lobulated tumor volume would result in a higher surface to volume ratio. To calculate this feature first we determine and count the pixels located at the surface of the tumor (e.g. as shown in FIGS. 2A-1 and 2B-1); the resulting number is divided by the sum of all the pixels in the tumor volume.

28. Sphericity

This is a measure of how spherical or rounded is the shape of the tumor volume. Defined in [16], the sphericity of an object is the ratio of the surface area of a sphere (with the same volume as the given object) to the surface area of the object:

$$\Psi = \frac{\pi^{\frac{1}{3}}(6V)^{\frac{2}{3}}}{A} \quad (B.30)$$

Where A and V are the surface area and volume of the tumor respectively as determined for the surface to volume ratio.

29. Compactness

This is an intrinsic characteristic of the shape of objects that has been widely used in pattern recognition tasks and represents the degree to which a shape is compact. The compactness of a three-dimensional tumor volume is obtained as follows:

$$Comp = \frac{V}{\sqrt{\pi} A^{2/3}} \quad (B.31)$$

The similarity to a sphere and compactness features are dimensionless numbers and they are independent to scaling and orientation. The feature generation phase of this methodology can be performed in a semi-fully automated fashion since the tumor delineations carried out by the physician are needed by the algorithm. The features enlisted in this appendix will be fed to a classifier as inputs in the learning and recognition phase of the classification task.

Radiomics Signature

The radiomics signature that is used in the method of the present invention is in more detail described below. The signature itself contains the following features: Statistics Energy, Shape Compactness, RLGL Gray Level Nonuniformity, Wavelet HLH RLGL Gray-Level Nonuniformity. These features are described herewith:

30. Statistics Energy

This feature is described by the following equation:

$$E_{tot} = V_{voxel} \sum_{x=1}^{x} \sum_{y=1}^{y} \sum_{z=1}^{z} I(x, y, z)^2 \quad (B.32)$$

Where $V_{voxel}$ is the voxel volume of the three dimensional image. The voxel volume is the product of the pixel spacing in x-direction, the pixel spacing in y-direction and the pixel spacing in z-direction. Total Energy is normalized by the voxel volume.

31. Shape Compactness

This feature is already described above as parameter 29 (equation B.31 above). Compactness, as the name already states, indicates how compact a 3D shape is. The most compact shape is a perfect sphere.

32. Gray Level Non-uniformity (GLN)

This feature is described by the following equation:

$$RLN = \frac{\sum_{i=1}^{N_g} \left( \sum_{j=1}^{N_r} p(i, j | \theta) \right)^2}{\sum_{i=1}^{N_g} \sum_{j=1}^{N_r} p(i, j | \theta)} \quad B.33$$

This gray-level run-length feature quantifies the textural heterogeneity in three dimensions within the tumor volume.

33. Wavelet HLH RLGL Gray-level Non-uniformity (GLN)

This Gray-Level Run-Length feature is the same as in equation B.33 above, but instead it is applied to the high-low-high filtered wavelet transform of the image data, quantifying the textural heterogeneity in three dimensions within the tumor volume. This parameter is thus obtained by taking the wavelet transform of the image and performing a high-low-high filtering In the above, V denotes the volume of the tumor, meaning the total number of voxels multiplied by the voxel size of a single voxel. The dimensions of the 3D volume are denoted by X,Y,Z. The total surface area of the tumor is denoted by A.

The gray level co-occurrence matrix is a matrix or distribution that is defined over an image to be the distribution of co-occurring values at a given offset. For the calculation of the Gray Level Non-uniformity (GLN), p denoted the gray level value of the corresponding voxel. The method is applied in all 3D directions. The wavelet transform is a time-frequency-transformation based on a wavelet series. Wavelet series are a representation of a square-integrable (real- or complex-valued) function by a certain orthonormal series generated by a wavelet. This representation is performed on a Hilbert basis defined by orthonormal wavelets. The wavelet transform provides information similar to the short-time-Fourier-transformation, but with additional special properties of the wavelets, which show up at the resolution in time at higher analysis frequencies of the basis function. Wavelet transforms provide the frequency of the signals and the time associated to those frequencies. High-low-high filtering applies to data analysis methods relying on wavelet transforms to detect certain activity patterns or variation patterns in the data; the high-low-high is thereby indicative of the wavelet shape. The high-low-high filter of the wavelet transform is used to calculate feature 33 above. The transform is applied directly on the raw CT image.

The obtained image feature parameter value is of particular prognostic value, and may be used alone or in combination with other features within a signature.

A neoplasm signature model value of an imaged neoplasm obtained using this particular signature model may be obtained as follows. Where no weighting factors would be used, signature model selector values simply take the value '1' in case an image feature is taken along in the signature model, or '0' in case the image feature is ignored. The signature selector values are used here as multipliers, which multiply the corresponding image feature parameter values. Then, the multiplied values may be summed (or alternatively a different functional relation may be applied, e.g. a polynomial, multiplication, or any other suitable relation).

In the present radiomics signature model, the image features indicated above (statistics energy, shape compactness, gray-level non-uniformity, and wavelet HLH RLGL gray-level non-uniformity) are selected. In the more complex model of the present embodiment, preferably, the signature model selector values include weighting factors. Therefore, instead of the selector values '1' and '0', the weights are applied while selecting the image feature parameter values—these weights are thus used as multiplicators for the image feature parameters of the signature model, which may then be summed to obtain signature model values. The corresponding weights are shown in the table below (the weight ranges refer to absolute values):

| Feature | Weight | Weight Range |
|---|---|---|
| Statistics Energy | 2.42e−11 | 1.0e−20-1.0e−05 |
| Shape Compactness | −5.38e−03 | 1.0e−07-1.0e−01 |
| RLGL_grayLevelNonuniformity | −1.47e−04 | 1.0e−09-1.0e−01 |
| Wavelet_HLH_rlgl_grayLevelNon-uniformity | 9.39e−06 | 1.0e−10-1.0e−02 |

Although a signature that uses the combination of the four image feature parameters is of particular predictive and prognostic value for treatment selection, it has been found that a signature based on only a subset of these features, or including other features, may still provide valuable results. In particular, signatures that include the Wavelet HLH RLGL Gray-Level Non-uniformity (GLN)—the gray level non-uniformity of the high-low-high filtered wavelet transform of the image data, are of particular value. All of these signatures fall within the scope of the present invention as defined by the claims.

In the above description, the invention is described with reference to some specific embodiments thereof. However, it will be appreciated that the present invention may be practiced otherwise than specifically described herein, in relation to these embodiments. Variations and modifications to specific features of the invention may be apparent to the skilled reader, and are intended to fall within the scope of the invention. The scope of the invention is merely restricted by the scope of the appended claims.

The invention claimed is:

1. An image analysis method for providing information for enabling determination of a phenotype of a neoplasm in a human or animal body for enabling prognostication, comprising the steps of:
   receiving, by a processing unit, image data of the neoplasm; and
   deriving, by the processing unit, a plurality of image feature parameter values from the image data, said image parameter values relating to image features associated with the neoplasm; and
   deriving, by said processing unit using a signature model, one or more neoplasm signature model values associated with the neoplasm from said image feature parameter values, wherein said signature model includes a functional relation between or characteristic values of said image feature parameter values for deriving said neoplasm signature model values therefrom;
   wherein the image feature parameter values are indicative of image feature parameters, wherein the signature model includes at least all of the image feature parameters from a group comprising: gray-level non-uniformity, and wavelet high-low-high gray-level run-length gray-level non-uniformity.

2. The image analysis method according to claim 1, wherein the signature model further includes at least all of the image feature parameters from a group comprising: statistics energy, and shape compactness.

3. The image analysis method according to claim 1, wherein the method further comprises the steps of:
   obtaining, by said processing unit from a memory, said signature model comprising one or more signature selector values associated with the image features, wherein the signature selector values indicate whether the associated image features are comprised by the signature model; and
   multiplying for the at least one signature model, by the processing unit, the image feature parameter values with the associated signature selector values for obtaining said one or more neoplasm signature model values associated with the neoplasm.

4. The image analysis method according to claim 1, further comprising a step of comparing, by the processing unit, the neoplasm signature model values to at least one signature model reference value for the at least one signature model, for associating the neoplasm with the phenotype.

5. The image analysis method according to claim 1, wherein the signature selector values further comprise one or more weighting values associated with the image features comprised by the signature model, for weighing the image features in the signature model.

6. The image analysis method according to claim 1, further comprising a step of calculating, by the processing unit, a neoplasm signature model score as a function of the one or more neoplasm signature model values, wherein the step of comparing includes comparing the neoplasm signature model score with a reference score.

7. The image analysis method according to claim 1, wherein the at least one signature model comprises a plurality of distinct signature models.

8. The image analysis method according to claim 1, wherein the image feature parameters further include at least one element of a group comprising: first-order gray level statistics obtained from image pixels or areas of the image from the image data; second-order gray level statistics obtained from co-occurrence matrices of the image data;

run-length gray level statistics, short run emphasis, long run emphasis, run percentage; and shape and size based features.

9. The image analysis method according to claim 2, wherein in accordance with the signature model, the image feature parameter statistics energy has an associated absolute weighting value within a range of 1.0e−20 through 1.0e−5; the image feature parameter shape compactness has an associated absolute weighting value within a range of 1.0e−7 through 1.0e−1; the image feature parameter gray-Level non-uniformity has an associated absolute weighting value within a range of 1.0e−9 through 1.0e−1; and the image feature parameter wavelet high-low-high gray-level run-length gray-level non-uniformity has an associated absolute weighting value within a range of 1.0e−9 through 1.0e−1.

10. The image analysis method according to claim 1, wherein the image data is received using an imaging method selected from a group comprising magnetic resonance imaging, computed tomography, positron emission tomography, single-photon emission computed tomography, ultrasonography, thermography, and photo-acoustic imaging.

11. The image analysis method in accordance with claim 1, any of the previous claims, wherein the step of receiving image data comprises the steps of receiving first image data of the neoplasm at a first moment in time and receiving second image data of the neoplasm at a second moment in time, and wherein the steps of deriving the image feature parameter values, obtaining the signature model, and multiplying the image feature parameter values with the associated signature selector values is performed for said first and second image data, further comprising a step of determining a difference between the neoplasm signature model values of the first and second image data.

12. A decision support system arranged for performing an image analysis method for providing information for enabling determination of a phenotype of a neoplasm in a human or animal body for enabling prognostication, said system comprising an input connected to a processing unit for receiving by the processing unit image data of the neoplasm; wherein the processing unit is further arranged for deriving a plurality of image feature parameter values from the received image data, said image parameter values relating to image features associated with the neoplasm, wherein the processing unit is connected to a memory for obtaining therefrom at least one signature model comprising one or more signature selector values associated with the image features, wherein the signature selector values indicate whether the associated image features are comprised by the signature model, and wherein the processing unit is arranged for multiplying for the at least one signature model the image feature parameter values with the associated signature selector values for obtaining one or more neoplasm signature model values associated with the neoplasm; wherein the image feature parameter values are indicative of image feature parameters, wherein the signature model includes at least all of the image feature parameters from a group comprising: statistics energy, shape compactness, gray-level non-uniformity, wavelet high-low-high gray-level run-length gray-level non-uniformity.

13. The decision support system according to claim 12, wherein the processing unit is further arranged for comparing the neoplasm signature model values to at least one signature model reference value for the at least one signature model, for associating the neoplasm with the phenotype, the system further comprising an output for providing an indicator value indicative of a result of said step of associating.

14. The decision support system according to claim 12, wherein the signature selector values further comprise one or more weighting values associated with the image features comprised by the signature model, for weighing the image features in the signature model, and wherein in accordance with the signature model, the image feature parameter statistics energy has an associated absolute weighting value within a range of 1.0e−20 through 1.0e−5; the image feature parameter shape compactness has an associated absolute weighting value within a range of 1.0e−7 through 1.0e−1; the image feature parameter gray-level non-uniformity has an associated absolute weighting value within a range of 1.0e−9 through 1.0e−1; and the image feature parameter wavelet high-low-high gray-level run-length gray-level non-uniformity has an associated absolute weighting value within a range of 1.0e−9 through 1.0e−1.

15. A non-transistory computer-readable medium comprising computer-executable instructions which, when run on a computer, are arranged for performing an image analysis method for providing information for enabling determination of a phenotype of a neoplasm in a human or animal body for enabling prognostication, the method comprising the steps of:
receiving, by a processing unit, the image data of the neoplasm; and
deriving, by the processing unit, a plurality of image feature parameter values from the image data, said image parameter values relating to image features associated with the neoplasm; and
deriving, by said processing unit using a signature model, one or more neoplasm signature model values associated with the neoplasm from said image feature parameter values, wherein said signature model includes a functional relation between or characteristic values of said image feature parameter values deriving said neoplasm signature model values therefrom,
wherein the image feature parameter values are indicative of image feature parameters, and
wherein the signature model includes at least all of the image feature parameters from a group comprising:
gray-level non-uniformity, and
wavelet high-low-high gray-level run-length gray-level non-uniformity.

16. The image analysis method according to claim 8, wherein the first order gray level statistics are selected from minimum intensity, maximum intensity, mean intensity, intensity range, intensity variance, intensity standard deviation, skewness, kurtosity and entropy.

17. The image analysis method according to claim 8, wherein the second-order gray level statistics are selected from contrast, correlation between neighboring image axels or pixels, energy, homogeneity, inverse difference moment, sum average, sum variance, and sum entropy.

18. The image analysis method according to claim 8, wherein the shape and size based features are selected from perimeter, cross-sectional area, major axis length, maximum diameter, and volume.

* * * * *